(12) United States Patent
Kudo

(10) Patent No.: US 6,296,567 B1
(45) Date of Patent: Oct. 2, 2001

(54) VIDEO GAME MACHINE AND COMPUTER-READABLE RECORDING MEDIUM CONTAINING VIDEO GAME PROGRAM

(75) Inventor: Shinichi Kudo, Sapporo (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/267,235

(22) Filed: Mar. 12, 1999

(30) Foreign Application Priority Data

Mar. 19, 1998 (JP) ................................................ 10-070925

(51) Int. Cl.$^7$ ...................................................... A63F 9/00
(52) U.S. Cl. ..................................... 463/7; 463/30; 463/8
(58) Field of Search ............................... 463/7, 8, 23, 30, 463/1; 273/461

(56) References Cited

U.S. PATENT DOCUMENTS

| | | | |
|---|---|---|---|
| 4,738,451 | * | 4/1988 | Logg ................................ 273/153 R |
| 5,720,663 | | 2/1998 | Nakatani et al. |
| 5,931,734 | * | 8/1999 | Nakatani et al. ....................... 463/23 |

FOREIGN PATENT DOCUMENTS

| | | |
|---|---|---|
| 8206357 | 8/1996 | (JP) . |
| 8224377 | 9/1996 | (JP) . |
| WO9625211 | 8/1996 | (WO) . |

OTHER PUBLICATIONS

Gauntlet, Mindscape Inc. Copyright Atari Games 1985, 1987.*

XenophageFAQ, dated Jul. 17, 1996 compiled by Doug Howell.*

1) Game Walker, Jan. 1998, No. 39, pp. 40–41, published on Jan. 1, 1998 by Kadokawa Shoten.

2) "Jugemu, 1998 vol. 2, Feb.", pp. 160–161, published o Feb. 1, 1998 by Recruit Co., Ltd.

3) "Weekly Fami–tsu, Feb. 6" pp. 101 to 105, published on Feb. 6, 1998 by Kabushiki Kaisha ASCII.

"Tekken 2" Online!, Nov. 26, 1996, XP002162180 Retrieved from the Internet: <URL: psx,ign.com/reviews/475.html> retrieved on Mar. 6, 2001! * p. 1, paragraph 3 *.

* cited by examiner

*Primary Examiner*—Joe H. Cheng
*Assistant Examiner*—Kathleen M. Christman
(74) *Attorney, Agent, or Firm*—Jordan and Hamburg LLP (57) ABSTRACT

A video game machine uses a leading game character operated by a game player. The game character can be selected from among a first game character and a second game character. The video game machine includes a recording medium. The recording medium contains a first game content having the first character as a leading game character, a second game content having the second character as a leading game character, and a third game content that can be enabled only when the first and second game contents are met. The first and second game contents are provided so that the first and second characters act independently in the same game world. The first and second game contents are independent of each other, but have relevance in that the first game content uses the second character and the second game content uses the first character.

8 Claims, 7 Drawing Sheets

VIDEO GAME MACHINE AND COMPUTER-READABLE RECORDING MEDIUM CONTAINING VIDEO GAME PROGRAM

BACKGROUND OF THE INVENTION

1. Field of the Invention

The present invention relates to video game machines using a recording medium containing program data, such as an optical disk, a magnetic disk, or a semiconductor memory, and to recording media containing video game programs.

2. Description of the Related Art

Many game systems have been proposed, such as a system comprised of a home-use game console and a television monitor, a commercial-use game machine, and a system comprised of a personal computer or work station, a display, and an audio output device.

These game systems each include a player-operated controller, a recording medium containing game-program data, a central processing unit (CPU) for performing control for the generation of sound and images based on the game-program data, a processor for generating images, a processor for generating sound, a monitor for displaying images, and a speaker for outputting the generated sound. In many cases, the types of recording medium include a compact-disk read-only memory (CD-ROM), a semiconductor memory, and a cassette having a built-in semiconductor memory.

Conventional video games for these video game machines are known in which a game player selects a leading game character from among a plurality of predetermined leading game characters.

The conventional video games are nothing but simple games in which a leading game character can be selected from a plurality of leading game characters. Their game contents are single; that is, a selected leading game character is used to play the same game.

Accordingly, if the game player selects any one of leading game characters, nothing changes in the game content having the character. Repeatedly playing the game causes monotony, and the game becomes uninteresting.

In some video games, independent game contents are provided for a plurality of leading game characters. The game contents are not related to one another, and a plurality of types of games can be simply played.

In some video games, mutually related game contents are provided for a plurality of leading game characters, and when the game corresponding to a selected leading game character is played, a game subsequently played is influenced by action of the leading game character in the first game. In each game content, the other leading game character does not interest the player since the other leading game character does not appear.

SUMMARY OF THE INVENTION

Accordingly, it is an object of the present invention to provide a video game machine in which a leading game character is selected from a plurality of leading game characters corresponding to a plurality of game contents and amusement by each game content is enhanced, and a computer-readable recording medium containing a video game program.

According to a first aspect of the present invention, the foregoing object is achieved through provision of a video game machine comprising a display unit for displaying images of a game performed in a predetermined game world; at least one operation unit for outputting an operation signal in accordance with an external operation; a first-game-content storage unit for storing a first game content using a first game character as a leading game character, and a second game character; a second-game-content storage unit for storing a second game content using the second character as a leading game character, and the first character; a leading-character selection unit for selecting either the first character or the second character as a leading game character; a game-screen output unit for outputting, to the display unit, game screens in accordance with the game content corresponding to the selected leading character; a game-progress control unit for advancing the set game content by using the operation signal to control the action of the leading character displayed on the display unit; a first condition determination unit for determining whether a predetermined first game condition for the first game content is met; a second condition determination unit for determining whether a predetermined second game condition for the second game content is met; a permission unit in which when either the first game condition or the second game condition is met, the permission unit permits the leading-character selection unit to select the other game character; a third-game-content storage unit for storing a third game content provided so that either the first character or the second character can be selected as a leading game character; a third-game leading-character selection unit for selecting either the first character or the second character as the leading character of the third game content; and a third-game screen-output unit for outputting, to the display unit, game screens in accordance with the third game content when both the first and second game conditions are met.

The first game content may be a fighting game in which the first character fights so as to cause a predetermined amount of damage to at least one first enemy game character. The second game content may be a fighting game in which the second character fights so as to cause a predetermined amount of damage to at least one second enemy game character. The first game condition may be met when the first character causes the predetermined amount of damage to the first enemy character on condition that the second game condition is met, or may be met when the first character causes a predetermined amount of damage to a first boss-enemy game character appearing after causing the predetermined amount of damage to the first enemy character in the case where the second game condition is not met. The second game condition may be met when the second character causes the predetermined amount of damage to the second enemy character on condition that the first game condition is met, or may be met when the second character causes a predetermined amount of damage to the first boss-enemy character appearing after causing the predetermined amount of damage to the second enemy character in the case where the first game condition is not met. The third game content may be a fighting game in which the selected leading character fights so as to cause a predetermined amount of damage to a second boss-enemy game character.

According to a second aspect of the present invention, the foregoing object is achieved through provision of a computer-readable recording medium containing a video game program for performing a game in a predetermined game world, the video game program having a first game content using a first game character as a leading game character, and a second game character; a second game content using the second character as a leading game character, and the first game character; and a third game content provided so that either the first character or the second character is selected as a leading game character; the video game program comprising a leading-character selection step for selecting either the first character or the second character as a leading game character; a game-screen output step for outputting, to a display unit, game screens in accordance with the game content corresponding to the selected game character; a game-progress control step for advancing the set game content by using an operation signal in accordance with an operation by an operation unit to control the action of the leading character displayed on the display unit; a first condition determination step for determining whether a predetermined first game condition for the first game content is met; a second condition determination step for determining whether a predetermined second game condition for the second game content is met; a permission step in which when either the first game condition or the second game condition is met, the permission unit permits the leading-character selection unit to select the other game character; a third-game leading-character selection step for selecting either the first character or the second character as the leading character of the third game content; and a third-game screen-output step for outputting, to the display unit, game screens in accordance with the third game content when both the first and second game conditions are met.

According to a third aspect of the present invention, the foregoing object is achieved through provision of a video game machine comprising a display unit for displaying images of a game performed in a predetermined game world; at least one operation unit for outputting an operation signal in accordance with an external operation; a game-content storage unit for storing a plurality of game contents using a plurality of game characters and one of the plurality of game characters as a leading game character; a leading-character selection unit for selecting one game character as a leading game character from among the plurality of game characters; a game-screen output unit for outputting, to the display unit, game screens in accordance with the game content corresponding to the selected leading character; a game-progress control unit for advancing the set game content by using the operation signal to control the action of the leading character displayed on the display unit; a condition determination unit for determining whether each of predetermined game conditions provided for the plurality of game contents is met; a permission unit for permitting the leading-character selection unit to select another game character from among the plurality of game characters when any one of the predetermined game conditions is met; a third-game-content storage unit for storing a third game content provided so that one of the plurality of game characters is used as a leading game character; a third-game-leading-character selection unit for selecting one game character as the leading character of the third game content from among the plurality of game characters; and a third-game-screen output unit for outputting, to the display unit, game screens in accordance with the third game content when all the plurality of game conditions are met.

According to a fourth aspect of the present invention, the foregoing object is achieved through provision of a computer-readable recording medium containing a video game program for performing a game in a predetermined game world, the video game program having a plurality of game contents using a plurality of game characters and one of the plurality of game characters as a leading game character; and a third game content provided so that one game character is selected as a leading game character from among the plurality of game characters; the video game program comprising a leading-character selection step for selecting one game character as a leading game character from among the plurality of game characters; a game-screen output step for outputting, to a display unit, game screens in accordance with the game content corresponding to the selected leading character; a game-progress control step for advancing the set game content by using an operation signal in accordance with an operation by an operation unit to control the action of the leading character displayed on the display unit; a condition determination step for determining whether each of predetermined game conditions provided for the plurality of game contents is met; a permission unit for permitting the leading-character selection step to select another game character from the plurality of game characters when any one of the predetermined game conditions is met; a leading-character selection step for selecting one game character as the leading character of the third game content from among the plurality of game characters; and a third-game-screen output step for outputting, to the display unit, game screens in accordance with the third game content when all the plurality of game conditions are met.

According to a fifth aspect of the present invention, the foregoing object is achieved through provision of a video game machine comprising a display unit for displaying images of a game performed in a predetermined game world; at least one operation unit for outputting an operation signal in accordance with an external operation; a first-game-content storage unit for storing a first game content as a fighting game using a first game character as a leading game character, and a second leading game character, the first character fighting so as to cause a predetermined amount of damage to at least one first enemy game character; a second-game-content storage unit for storing a second game content, which differs from the first game content, as a fighting game using the second character as a leading game character, and the first character, the second character fighting so as to cause a predetermined amount of damage to at least one second enemy game character; a leading-character selection unit for selecting either the first character or the second character as a leading game character; a game-screen output unit for outputting, to the display unit, game screens in accordance with the game content corresponding to the selected leading character; and a game-progress control unit for advancing the set game content by using the operation signal to control the action of the selected leading character displayed on the display unit; wherein the first game content is provided so that in a scene where the second character appears, the first and second characters fight so as to cause a predetermined amount of damage to different enemy game characters, respectively, and the second game content is provided so that in a scene where the first character appears, the first and second characters fight so as to cause a predetermined amount of damage to different enemy game characters, respectively.

According to a sixth aspect of the present invention, the foregoing object is achieved through provision of a computer-readable recording medium containing a video game program for performing a game in a predetermined game world, the video game program having a first game content as a fighting game using a first game character as a leading game character, and a second game character, the first character fighting so as to cause a predetermined amount of damage to at least one first enemy character; and a second game content as a fighting game which differs from the first game content, the second game content using the second character as a leading game character, and the first character, the second character fighting so as to cause a predetermined amount of damage to at least one second enemy character; the video game program comprising a leading-character selection step for selecting either the first character or the second character as a leading game character; a game-screen output step for outputting, to a display unit, game screens in accordance with the game content corresponding to the selected game character; a game-progress control step for advancing the set game content by using an operation signal in accordance with an operation by an operation unit to control the action of the leading character displayed on the display unit; wherein the first game content is provided so that in a scene where the second character appears, the first and second characters fight so as to cause a predetermined amount of damage to different enemy game characters, respectively, and the second game content is provided so that in a scene where the first character appears, the first and second characters fight so as to cause a predetermined amount of damage to different enemy game characters, respectively.

According to the present invention, both a first game character and a second game character are used in each game content. This enhances amusement by each game content.

According to the present invention, a first game content and a second game content can be sequentially performed. This enhances amusement by each game content. In addition, when the game player leaves the first and second games, game screens in accordance with a third game content are output, whereby the amusement is further enhanced. In the third game content, its leading game character can be selected, which diversifies the game.

According to the present invention, a first enemy character against a first game character differs from a second enemy character against a second game character. Therefore, even if both the first and second games are performed, a game player enjoys fighting games that differ for the respective game contents.

According to the present invention, game contents are provided so that one game character as a leading game character, and the leading game character of another game content, are used. This enhances amusement by each game content.

According to the present invention, when among predetermined game conditions for a plurality of game contents, any one game condition is met, it is allowed to select a game character in another game condition. Thereby, the game contents are sequentially performed, which enhances amusement by the game contents.

According to the present invention, when the game player leaves a first game and a second game, game screens in accordance with a third game content as the final stage are output, whereby amusement by each game is enhanced. The third game content has a leading game character that can be selected, which enhances game diversity.

According to the present invention, in each of a first game content and a second game content, a first game character and a second game character are used, which enhances amusement by each game content.

According to the present invention, a game content differs in accordance with the selection of a leading game character from among a first game character and a second game character. Therefore, even if both characters are sequentially selected, the same game content is not repeatedly performed. This enables amusement by each game content.

According to the present invention, a first enemy character against a first game character in a first game content differs from a second enemy character against a second game character in a second game content. Therefore, even if both game contents are performed, fighting games that differ for the respective game contents are enjoyed.

According to the present invention, a first game content and a second game content are provided so that in a scene where a first game character and a second game character appear, the first and second characters fight with different enemy characters, respectively. Therefore, the original features of each game content are emphasized, and amusement by each game content is enhanced.

DESCRIPTION OF THE PREFERRED EMBODIMENTS

Figure 1:
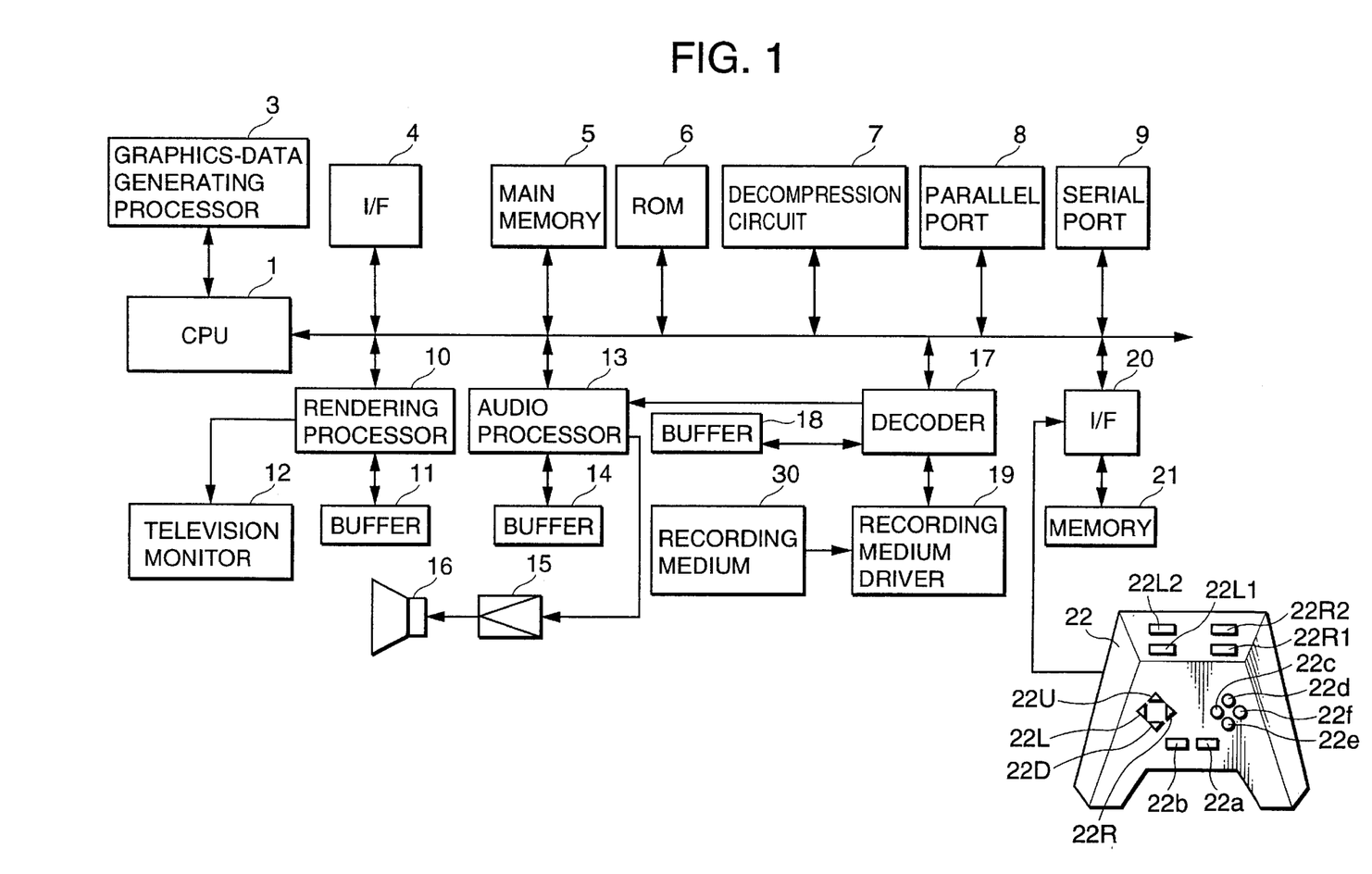
FIG. 1 is a block diagram showing a game system according to an embodiment of the present invention.

FIG. 1 shows a game system according to an embodiment of the present invention.

This game system consists of a main unit and a recording medium 30 containing program data. The main unit includes a CPU 1, a bus 2 comprised of an address bus, a data bus, and a control bus 2, and components connected to the bus 2.

A graphics-data generating processor 3, an interface circuit 4, a main memory 5, a read only memory (ROM) 6, a decompression circuit 7, a parallel port 8, a serial port 9, a rendering processor 10 and a buffer 11 therefor, an audio processor 13 and a buffer 14 therefor, a decoder 17 and a buffer 18 therefor, and an interface circuit 20 and a memory 21 therefor, are connected to the bus 2.

A television monitor (hereinafter referred to simply as a "monitor") 12 is connected to the rendering processor 10. A speaker 16 is connected to the audio processor 13 via an amplifier circuit 15. A recording medium driver 19 is connected to the decoder 17. The memory 21 and a controller 22 are connected to the interface circuit 20.

The form of the game system of FIG. 1 differs depending on its purpose.

In other words, in the case where the game system is intended for home use, the monitor 12, and the speaker 16 are separately provided.

In the case where the game system is intended for commercial use, all the components shown in FIG. 1 are integrated in a casing.

In the case where the game system of FIG. 1 has a personal computer or workstation at its core, the correspondance between the game system of FIG. 1 and the components of the computer or workstation is as follows:

the monitor 12 corresponds to a computer display; the rendering processor 10, the audio processor 13, and the decompression circuit 7 each correspond to part of the game program data recorded on the recording medium 30, or the hardware of an add-in board set in an add-in slot of the computer or workstation;

the interface circuit 4, the parallel port 8, the serial port 9, and the interface circuit 20 correspond to the hardware of an add-in board set in an add-in slot of the computer or workstation; and each buffer 11, 14, or 18 corresponds to the main memory 5 or an area of an extension memory (not shown).

In this embodiment, the case where the game system is intended for home use is described.

The components shown in FIG. 1 are described below.

The graphics-data generating processor 3 functions as a so-called co-processor. In other words, the graphics-data generating processor 3 performs parallel processing for coordinate transformation and illumination computation, for example, computation of a fixed point matrix and vectors. Main processes performed by the graphics-data generating processor 3 include a process for finding, based on coordinate data on each vertex (in a two-dimensional or three-dimensional plane) of image data supplied from the CPU 1, the address (in a display area) of an image to be processed, and sending back the address data to the CPU 1; and a process for computing the brightness of an image in accordance with a distance from a virtual light source.

The interface circuit 4 connects the main unit and peripheral devices, for example, pointing devices such as mice and track balls. The ROM 6 contains program data as an operating system for the game system. The program data correspond to a basic input output system (BIOS) in a personal computer.

The decompression circuit 7 decompresses an image compressed by intra-coding based on the Moving Picture Engineering Group (MPEG) standard for moving pictures, or the Joint Picture Engineering Standard (JPEG) standard for still pictures. Decompression consists of decoding (the decoding of data encoded using a variable length code), inverse quantization, inverse discrete cosine transform (IDCT), intra-image restoration, etc.

The rendering processor 10 performs rendering in the buffer 11, based on a rendering command issued by the CPU 1.

The buffer 11 consists of a display area and a non-display area. In the display area, data to be displayed on the screen of the monitor 12 are loaded.

In this embodiment, in the non-display area, data for defining skeletons, model data for defining polygons, animation data for causing models to move, pattern data representing the contents of animations, texture data, color-palette data, etc., are stored.

The texture data are two-dimensional image data. The color-palette data are used to select a color for a texture data or the like. These data are prerecorded from the recording medium 30 into the non-display area of the buffer 11 by the CPU 1 once or a number of times in accordance with the progress of the game.

Each rendering command includes a rendering command for using polygons to render a three-dimensional image, and a rendering command for rendering an ordinary two-dimensional image. The polygons are two-dimensional virtual polygonal figures. In this embodiment, triangles or quadrangles.

The rendering command for using polygons to render a three-dimensional image consists of a polygon-vertex-address data in the display area of the buffer 11, a texture-address data representing a position at which a texture data to be pasted is stored in the buffer 11, a color-palette-address data representing a position at which a color-palette data representing the color of the texture data is stored in the buffer 11, and a brightness data representing a texture brightness.

Among these data, the polygon-vertex-address data in the display area of the buffer 11 is obtained such that a polygon-vertex-coordinate data (in a three-dimensional space) from the CPU 1 is replaced with a two-dimensional polygon-vertex-coordinate data by performing, based on movement data and rotation data on the screen (viewpoint), the coordinate transformation of the polygon-vertex-coordinate data. The brightness data is determined based on the distance from a position represented by the obtained two-dimensional polygon-vertex-coordinate data to the virtual light source.

The polygon-vertex-coordinate data represents an address in the display area of the buffer 11. In a range of the display area (of the buffer 11) which is represented by three or four polygon-vertex-address data, corresponding texture data are written by the rendering processor 10.

One object consists of a plurality of polygons. The CPU 1 stores three-dimensional-space coordinate data on each polygon in the buffer 11 so that the coordinate data are correlated with corresponding skeleton vector data. In the case where a game character is moved on the screen, in other words, movement of the game character is expressed, or a viewpoint from which the game character is viewed is changed, the following processes are performed by using the controller 22.

The CPU 1 supplies the graphics-data generating processor 3 with three-dimensional coordinate data on polygon vertices, which are stored in the non-display area of the buffer 11, and movement data and rotation data on polygons, which are found based on skeleton coordinates and its rotation data.

Based on the three-dimensional coordinate data on polygon vertices, and on the movement data and rotation data on polygons, the graphics-data generating processor 3 sequentially finds three-dimensional coordinate data on moved and rotated polygons.

Among the obtained three-dimensional coordinate data on polygons, horizontal and vertical coordinate data are supplied as address data, that is, polygon-vertex-address data, to the rendering processor 10.

The rendering processor 10 writes, in a triangular or tetragonal display area of the buffer 11 which is represented by three or four polygon-vertex-address data, a texture data represented by a pre-assigned texture address data. This displays, on the screen of the monitor 12, an object in which texture data are pasted on a plurality of polygons.

Each rendering command for rendering an ordinary two-dimensional image includes a vertex-address data, a texture-address data, a color-palette-address data representing a position at which a color-palette data representing a texture data is stored in the buffer 11, and a brightness data representing the brightness of a texture. Among these data, the vertex-address data is a coordinate data obtained such that the graphics-data generating processor 3 performs, based on movement data and rotation data from the CPU 1, the coordinate transformation of a two-dimensional vertex-coordinate data from the CPU 1.

The audio processor 13 stores, in the buffer 14, adaptive-differential-pulse-code-modulated (ADPCM) data read from the recording medium 30, and uses the ADPCM data as a audio source. The audio processor 13 reads the ADPCM data, using a clock signal having a frequency of 44.1 MHz.

The audio processor 13 performs processes for the ADPCM data read from the buffer 14, such as pitch transformation, noise addition, envelope setting, level setting, and reverbing.

In the case where audio data read from the recording medium 30 are pulse-code-modulated (PCM) data such as compact disk digital audio (CD-DA) data, the audio data are converted into ADPCM data by the audio processor 13.

The PCM data are directly processed in the main memory 5 by using the program data. The PCM data processed in the main memory 5 are supplied and converted into ADPCM data in the audio processor 13, and the above-described processes for the ADPCM data are performed before being output as sound from the speaker 16.

The recording medium driver 19 is, for example, a CD-ROM drive, a hard disk drive, an optical disk drive, a flexible disk drive, a silicon disk drive, a cassette medium reader, or the like.

The recording medium 30 is, for example, a CD-ROM, a hard disk, a flexible disk, a semiconductor memory, or the like.

The recording medium driver 19 reads images, sound, and program data from the recording medium 30, and supplies them to the decoder 17. The decoder 17 uses error-correcting codes to perform the error correction of the reproduced data, and supplies the error-corrected data to the main memory 5 or the audio processor 13.

The memory 21 chiefly consists of, for example, a card memory, and is used to store various game parameters such as termination conditions.

The controller 22 includes, as externally operable means, a first left button 22L1, a second left button 22L2, a first right button 22R1, a second right button 22R2, an up-key 22U, a down-key 22D, a left key 22L, a right key 22R, a start button 22a, a selector button 22b, a first button 22c, a second button 22d, a third button 22e, and a fourth button 22f. The controller 22 is operated by the game player, and outputs operation signals in accordance with operations.

The up-key 22U, the down-key 22D, the left key 22L, and the right key 22R are used by the game player to supply the CPU 1 with commands for vertically or horizontally moving a game character on the screen, or with a command for transferring the selection of icons on a menu screen.

The start button 22a is used for the game player to instruct the CPU 1 to initiate the game program loaded from the recording medium 30. The selector button 22b is used for the game player to instruct the CPU 1 to perform various selections related to the game program data loaded from the recording medium 30 into the main memory 5.

The functions of the first button 22c, the second button 22d, the third button 22e, the fourth button 22f, the first left button 22L1, the second left button 22L2, the first right button 22R1, and the second right button 22R2, differ depending on the game program data loaded from the recording medium 30.

Next, the operation of the game system is briefly described.

By turning on a main power switch (not shown), power is supplied to the game system. At this time, in the case where the recording medium 30 is loaded into the recording medium driver 19, the CPU 1 instructs the recording medium driver 19 to read the program data from the recording medium 19, based on an operating system stored in the ROM 6. In accordance with the instruction, the recording medium driver 19 reads images, sound, and program data from the recording medium 30.

The read images, sound, and program data are supplied and processed for error correction in the decoder 17. The error-corrected image data are supplied and decompressed in the decompression circuit 7 via the bus 2. The decompressed data are supplied to the rendering processor 10, and are written into the non-display area of the buffer 11 by the rendering processor 10.

The error-corrected audio data obtained in the decoder 17 are supplied to the main memory 5 or the signal processor 13, and are written in the main memory 5 or the buffer 14.

The error-corrected program data obtained in the decoder 17 are supplied and written in the main memory 5. Subsequently, the CPU 1 proceeds with the game, based on the game program data stored in the main memory 5, and on the content of an instruction from the controller 22 by the game player. In other words, based on the content of an instruction from the controller 22 by the game player, the CPU 1 controls image processing, audio processing, and internal processing.

In this embodiment, control of image processing includes skeleton-coordinate computation and polygon-vertex computation based on pattern data corresponding to an animation selected by a game character, the supply of the obtained three-dimensional coordinate data and viewpoint position data to the graphics-data generating processor 3, and the issue of a rendering command including address and brightness data (in the display area of the buffer 11) found by the graphics-data generating processor 3.

Control of audio processing includes the issue of an audio output command to the audio processor 13, level setting, and reverbing. Control of internal processing is, for example, computation in accordance with an operation from the controller 22, or the like.

Figure 2:
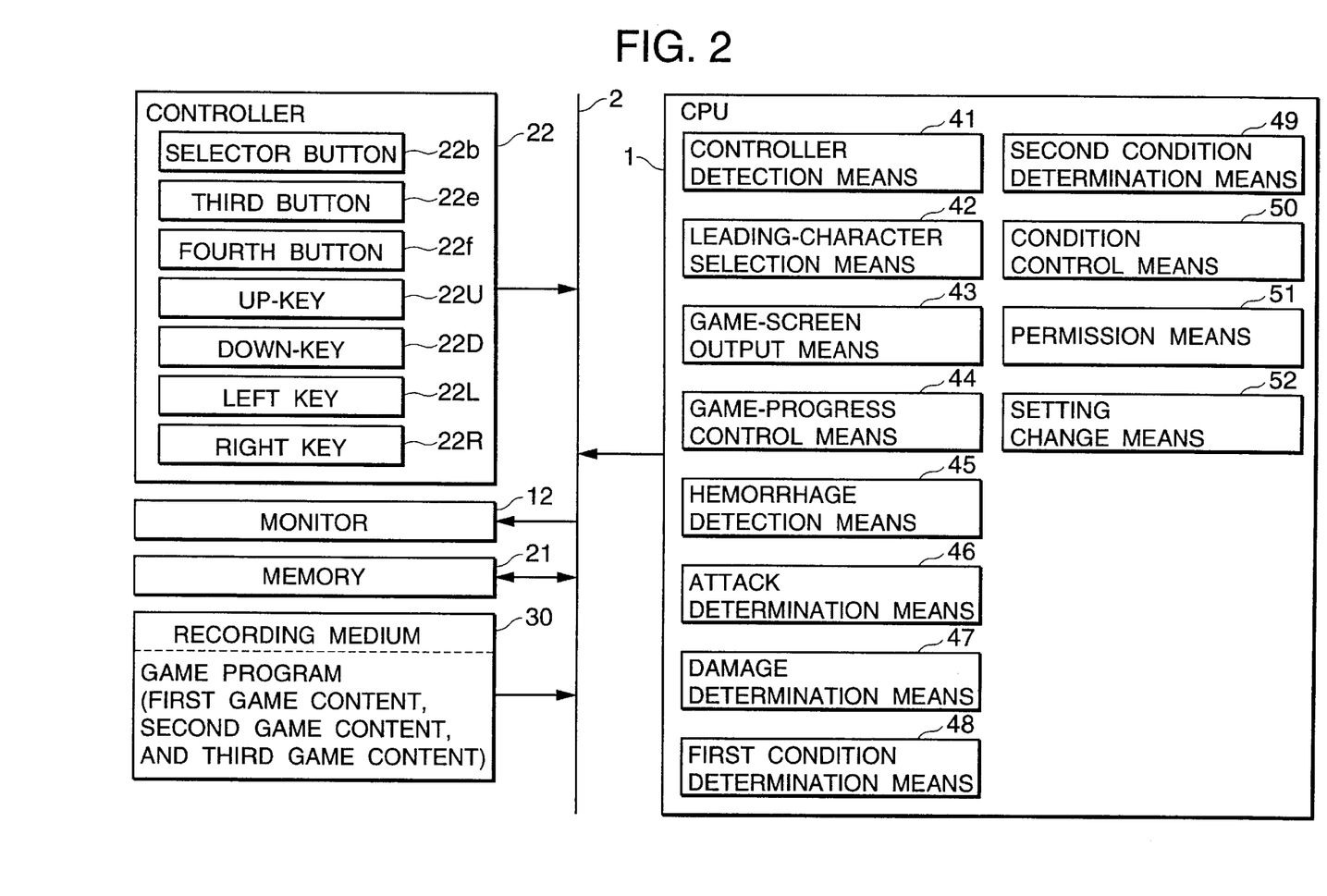
FIG. 2 is a block diagram showing the functional blocks of a CPU.

FIG. 2 shows the functional blocks of the CPU 1. Components connecting the monitor 12 and the bus 2, and components connecting the recording medium 30 and the bus 2, are not shown for brevity.

In games played using the game system, a leading game character to be manipulated by the game player can be selected from among a first game character and a second game character. The recording medium 30 contains a first game content having the first game character as a leading game character, a second game content having the second game character as a leading game character, and a third game content that can be performed only when the game player has left both the first and second game contents.

The first and second game contents are independent of each other, and are set so that the first character and the second character act independently in the same game world. However, the first and second game contents have relevance in that the first game content uses the second character, and the second game content uses the first character.

In the first game content, the first character as a leading character is manipulated to fight with a first enemy game character by using the controller 22, and when the first character beats the first enemy character by inflicting a predetermined amount of damage, the next stage begins.

In the second game content, the second character as a leading character is manipulated to fight with a second enemy game character which differs from the first enemy character by using the controller 22, and when the second character beats the first enemy character by inflicting a predetermined amount of damage, the next stage begins.

The first or second game content is set up such that when the other game content is still pending, the leading game character of one game fights with a first boss-enemy game character after beating all enemy game characters, and when the leading game character of the game beats the first boss-enemy character by inflicting a predetermined amount of damage, the game player is allowed to leave the game. If the game player has left the other game content, the game player is allowed to leave the game when all enemy characters are beaten.

The third game content can be performed only when the game player has left both the first and second game contents. In the third game content, its leading game character fights with a second boss-enemy game character, and when its leading character beats the second boss-enemy character by inflicting a predetermined amount of damage, the video game is terminated.

In other words, the first boss-enemy character has the function of a false boss-enemy character, and the second boss-enemy character has the function of a real boss-enemy character. By beating the second boss-enemy character as a real enemy-boss character, the entirety of the game can be terminated.

In any of the game contents, the game is terminated when the leading game character is damaged by a predetermined amount by the enemy character.

The CPU 1 includes a controller detection means 41, a leading-character selection means 42, a game-screen output means 43, a game-progress control means 44, a hemorrhage detection means 45, an attack determination means 46, a damage determination means 47, a first condition determination means 48, a second condition determination means 49, a condition control means 50, a permission means 51, and a setting change means 52.

The controller detection means 41 detects the switching of operation, based on an operation signal from each operation means of the controller 22. The leading-character selection means 42 controls the selection of a leading game character by the game player. By way of example, the leading-character selection means 42 displays, on the monitor 12, a selection screen on which the first character and the second character are arranged, and selects either character in accordance with the operation of the right and left keys 22R and 22L. By using the fourth button 22f to determine the selected character, the leading character is selected.

The game-screen output means 43 outputs the game content corresponding to the selected leading character on the monitor 12. The game-screen output means 43 outputs the first game content when the first character is selected as a leading character, and outputs the second game content when the second character is selected.

The game-progress control means 44 controls the action of the leading character displayed on the monitor 12 in accordance with an operation signal from the controller 22 which is detected by the controller detection means 41. By way of example, when an enemy game character appears on a game screen, the game-progress control means 44 controls the leading character to fight with the enemy character by using weapons (e.g., a sword and a throwing-knife in this embodiment) in accordance with the operation of the controller 22.

The hemorrhage detection means 45 determines, in a fight between the leading character and the enemy character, whether a hemorrhage determination condition is satisfied in which each character has been cut by a sword, or each character has been stabbed by a throwing-knife. The attack determination means 46 functions to determine whether each character is attacked. By way of example, the attack determination means 46 determines whether a part of the body such as the head or the arm is cut off with a sword in a fight between the leading character and the enemy character.

The damage determination means 47 determines an amount of damage generated during a fight between the leading character and the enemy character, the leading character being attacked by the enemy character or the leading character attacking the enemy character. The damage determination means 47 also determines that one game character has been beaten when damage reaches a predetermined amount.

That damage to the enemy character by the leading character has reached a predetermined amount is hereinafter referred to simply as "beating the enemy character".

The first condition determination means 48 determines that a first game condition is met when the first boss-enemy character is beaten in the case where the second game content is pending or when all first enemy characters are beaten in the case where the game player has left the second game content.

The second condition determination means 49 determines that a second game condition is met when the first boss-enemy character is beaten in the case where the game player has left the first game content or when all second enemy characters are beaten in the case where the game player has left the first game content.

When the first and second game conditions are met by the first and second determination means 45 and 46, the condition control means 50 creates and stores condition data in the memory 21.

When either the first or second game condition is met, the permission means 51 repeatedly performs the same game content, or permits the leading-character selection means 42 to again select a leading game character in order that another game content may be performed.

The setting change means 52 changes the setting of cruel expression displayed as game screens in the middle of a fight between the leading character and the enemy character. A process for changing the settings is described below. The setting change means 52 has the following functions (1) and (2):

(1) If the hemorrhage detection means 45 has determined that the hemorrhage determination condition is satisfied in the middle of the fight, the setting change means 52 sets the color (as a color effect) of blood from the leading character or the enemy character to be an arbitrary chromatic color of red to green to blue or to be transparent; and (2) If the attack determination means 46 has determined that an arm, the head, or the like of the leading character or the enemy character has been cut off, the setting change means 52 changes the setting of cutting image between scenes where the cut arm or head is sent flying and not sent flying.

The cruel image is an image that should be suppressed for ethical considerations.

In the game program recorded on the recording medium 30, the cruel image is set so that by default, the color of blood from the leading character or enemy character is set to be transparent, and the cut arm or the head is not sent flying.

The game-screen output means 43 outputs, to the monitor 12, game screens in accordance with setting by the setting change means 52.

Figure 3:
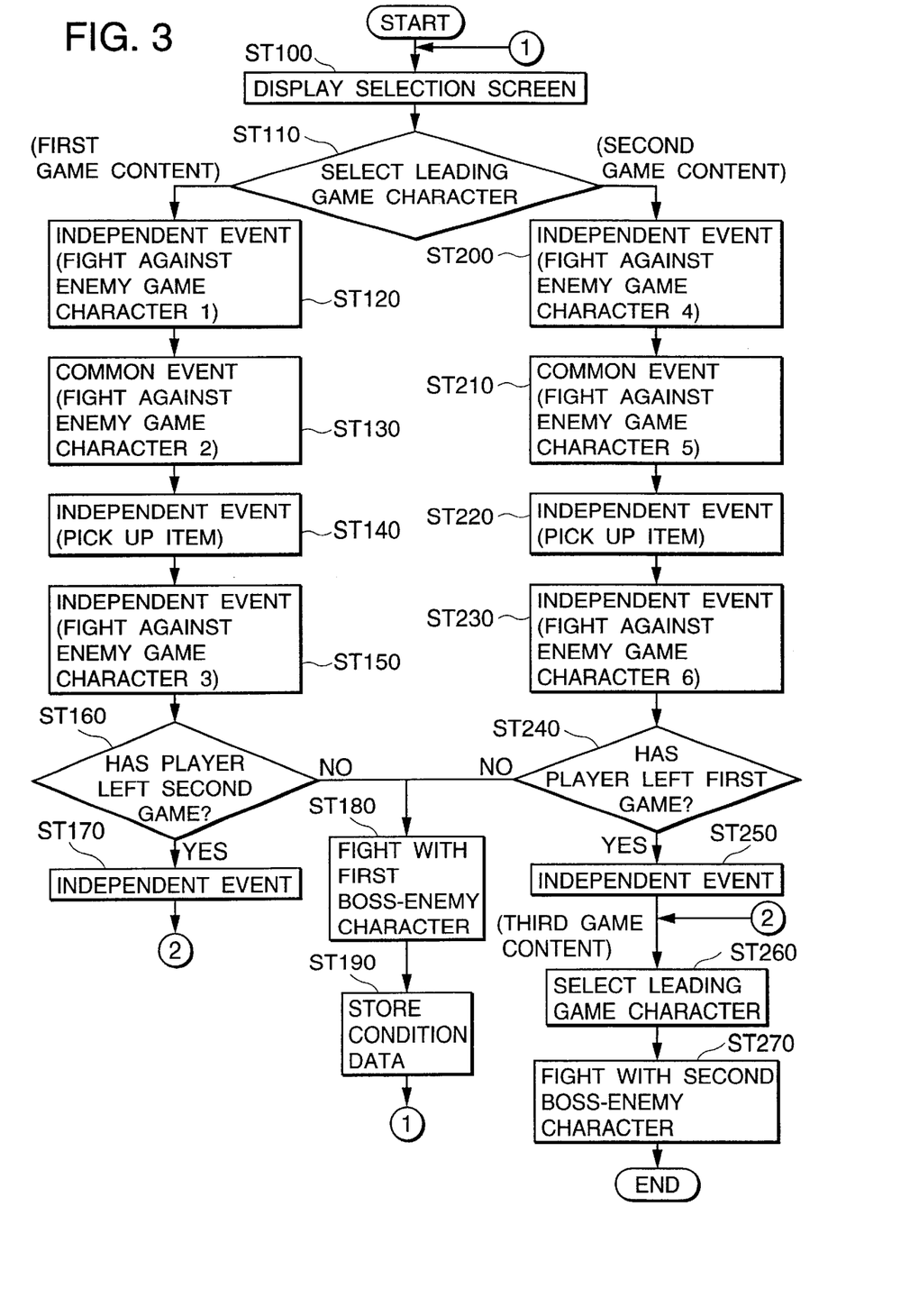
FIG. 3 is a flowchart showing a process for a video game performed in the game system shown in FIG. 1.
Figure 4:
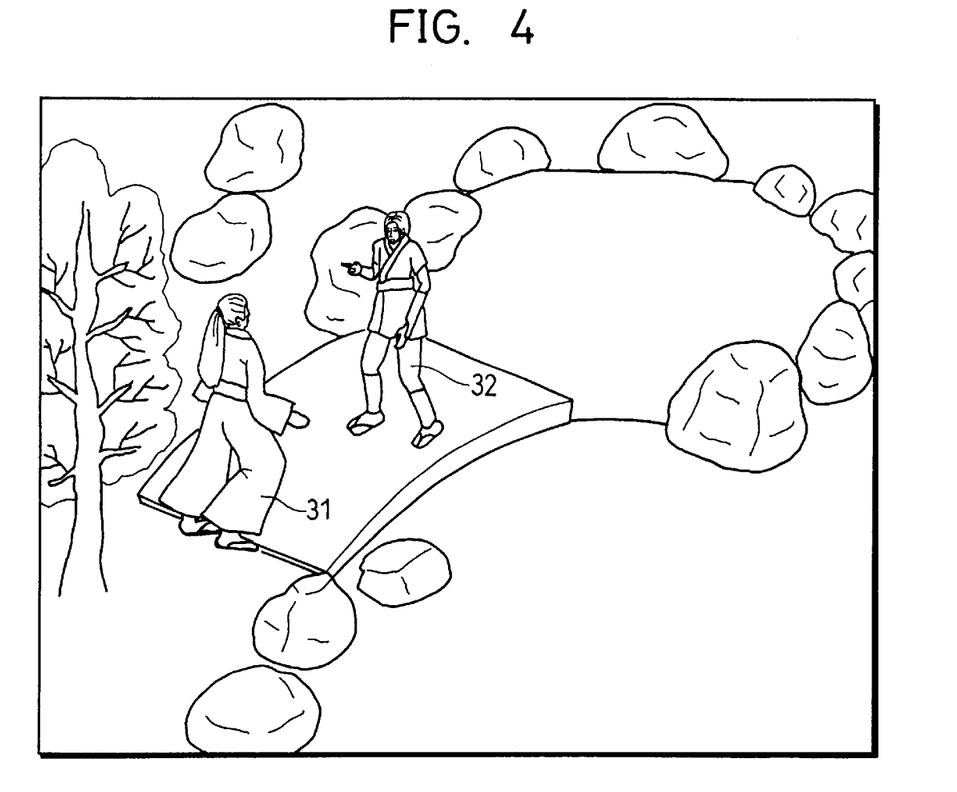
FIG. 4 is a drawing showing a game screen of the video game shown in FIG. 3.
Figure 5:
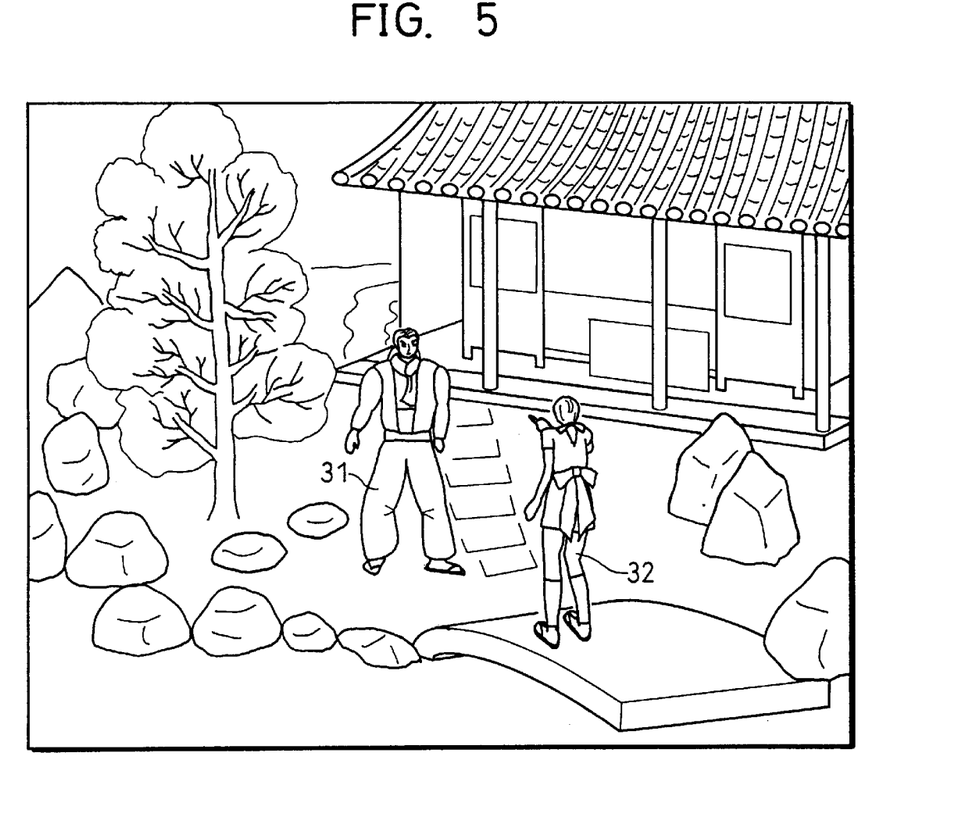
FIG. 5 is a drawing showing a game screen of the video game shown in FIG. 3.

Next, a video game process is described with reference to FIGS. 3 to 5. FIG. 3 shows a flowchart of the video game process, and FIGS. 4 and 5 show game screens, respectively.

If the leading character does not win a fight with an enemy character or a boss-enemy character, the game is terminated. This case is not shown in the flowchart described below for brevity.

Referring to FIG. 3, in step ST100, when the game is started, the monitor 12 displays a selection screen on which the first character and the second character are arranged so that either game character is selected as a leading game character. In step ST110, the player uses the controller 22 to select the leading character.

In the case where the first character is selected as the leading character, the process proceeds in accordance with the first game content. Initially, in step ST120, a fight against enemy game character 1 is performed as an independent event. In step ST130, a common event is provided.

This common event is a scene where the second character appears in addition to the first character as the leading character.

In this common event, as shown in FIG. 4, the first character 31 as a leading character (masterless samurai in this embodiment) has a conversation with the second character (ninja in this embodiment) 32.

In this common event, a scene where the first character as the leading character fights with enemy game character 2 is provided. A game screen corresponding to the scene in which the second character is fighting with another enemy game character at the back of the screen is displayed.

Referring back to FIG. 3, in step ST140, a scene where the leading character picks up an item such as a medicinal herb in accordance with an operation by the controller 22 is provided as an independent event. In step ST150, a fight with enemy game character 3 is performed as an independent event.

In step ST160, the process determines whether the game player has left the second game. If the game player has left the second game ("YES" in step ST160), an independent event is performed in step ST170, and the process proceeds to step ST260 and the subsequent steps provided for the third game.

If the second game is still pending ("NO" in step ST160), a fight against the first boss-enemy character is performed in step ST180. If the leading character beats the first boss-enemy character, condition data are created and stored in the memory 21 in step ST190, and the process returns to step ST100.

In step ST110, in the case where the second character is selected as a leading character, the process proceeds in accordance with the second game content. In step ST200, a fight against enemy game character 4 is performed as an independent event. In step ST210, a common event is provided.

This common event is a scene where the first character appears in addition to the second character as the leading character.

In this common event, as shown in FIG. 5, the second character (ninja in this embodiment) 32 as the leading character has a conversation with the first character (masterless samurai in this embodiment) 31. This scene is displayed as an image viewed from a viewpoint different from a viewpoint in a similar scene shown in FIG. 4.

In this common event, a scene where the second character as the leading character fights with enemy game character 5 is provided. A game screen corresponding to the scene in which the first character is fighting with another enemy game character at the back of the screen is displayed.

Referring back to FIG. 3, in step ST220, a scene where the leading character picks up an item such as a medicinal herb in accordance with an operation by the controller 22 is provided as an independent event similar to that in the first game content. In step ST230, a fight against enemy character 6 is performed as an independent event.

In step ST240, the process determines whether the game player has left the first game. If the game player has left the first game ("YES" in step ST240), an independent event is performed in step ST250, and the process proceeds to step ST260 and the subsequent steps for the third game.

If the first game is still pending ("NO" in step ST240), the process proceeds to step ST180, and steps similar to those in the first game content are performed.

In step ST260 in the third game content, the selection screen on which the first and second characters are arranged for selecting a leading game character is displayed on the monitor 12, again. The leading character is selected in accordance with an operation by the controller 22. In step ST260, the selected leading character fights with the second boss-enemy character. When the selected leading character beats the second boss-enemy character, the video game is terminated.

If the first character is initially selected, the process proceeds from step ST110 to step ST120, and performs steps ST120 to ST160. At this time, the second game has not been performed. Accordingly, the process proceeds from step ST160 to ST180, and in step ST190, disabling data on the first game are created and stored.

If the second character is selected, the process proceeds from step ST110 to step ST200, and performs steps ST200 to ST240. At this time, the game player has left the first game. Accordingly, the process proceeds from step ST240 to step ST250. Steps ST250 to ST270 are performed, and the process terminates.

As described above, the enemy character against the first character in the first game content completely differs from the enemy character against the second character. In this respect, the first game content and the second game content are independent of each other.

Therefore, if both the game contents are repeatedly played, they are not performed as the same game content, which enhances amusement by each game content.

In addition, if the first character has picked up an item such as a medicinal herb in step ST140 in the first game content, the second character is not allowed to pick up the same item in step ST220 in the second game content.

As described above, the first game content and the second game content influences each other because they have relevance in that a result of executing a first game content changes a game screen displayed by executing the subsequent game content. Therefore, amusement by each game content can be enhanced.

The first or second game content is set up that when the leading character fights with the boss-enemy character, and the game player is once allowed to leave the game, the game player is allowed to leave the other game without a fight between the leading character and the boss-enemy character, and the process proceeds to the third game content as the final stage.

The first boss-enemy character has the function of a false boss-enemy game character, and the second boss-enemy character has the function of a real boss-enemy game character. This can enhance amusement by the game.

Figure 6:
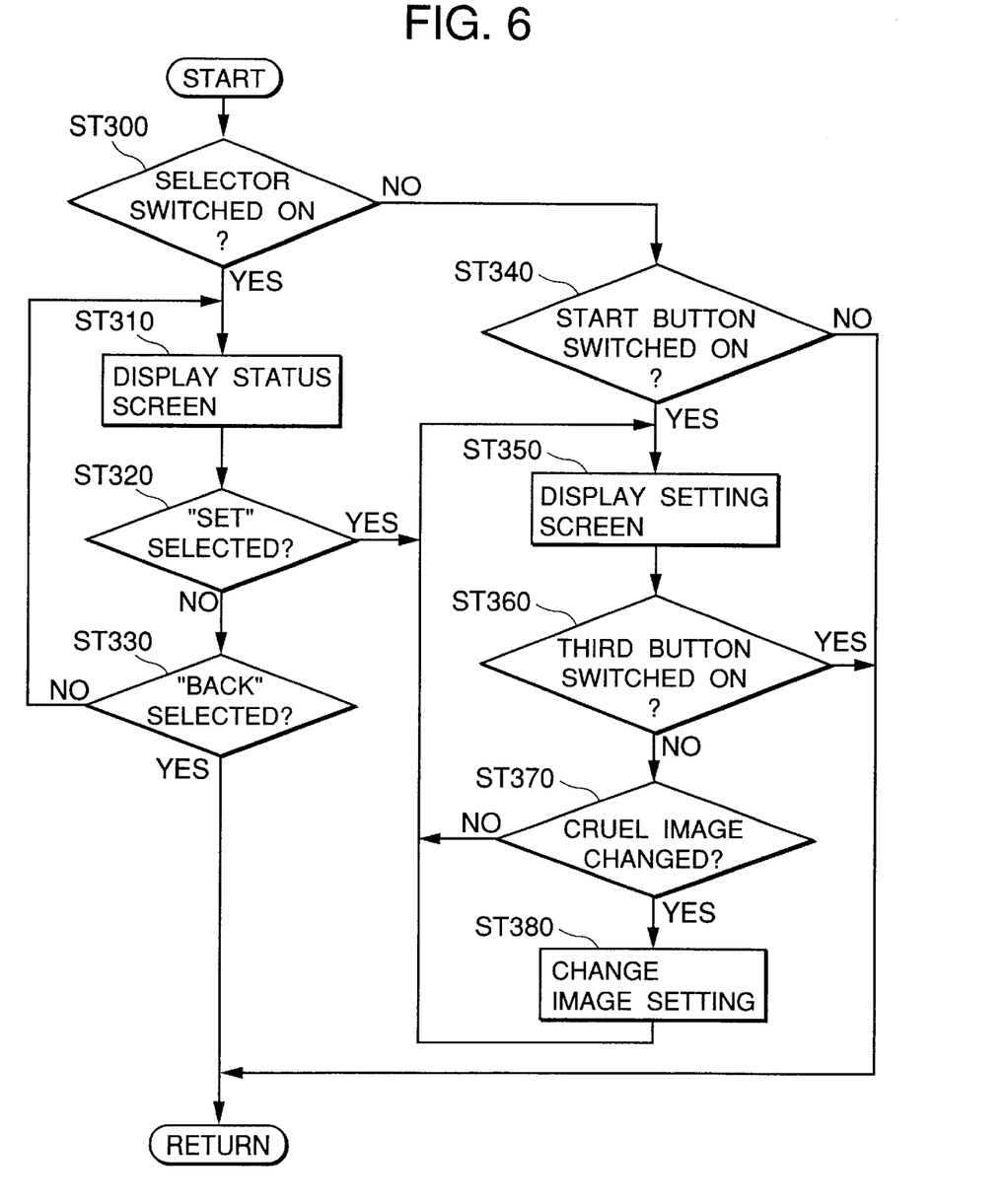
FIG. 6 is a flowchart showing a process for changing image setting.
Figure 7:
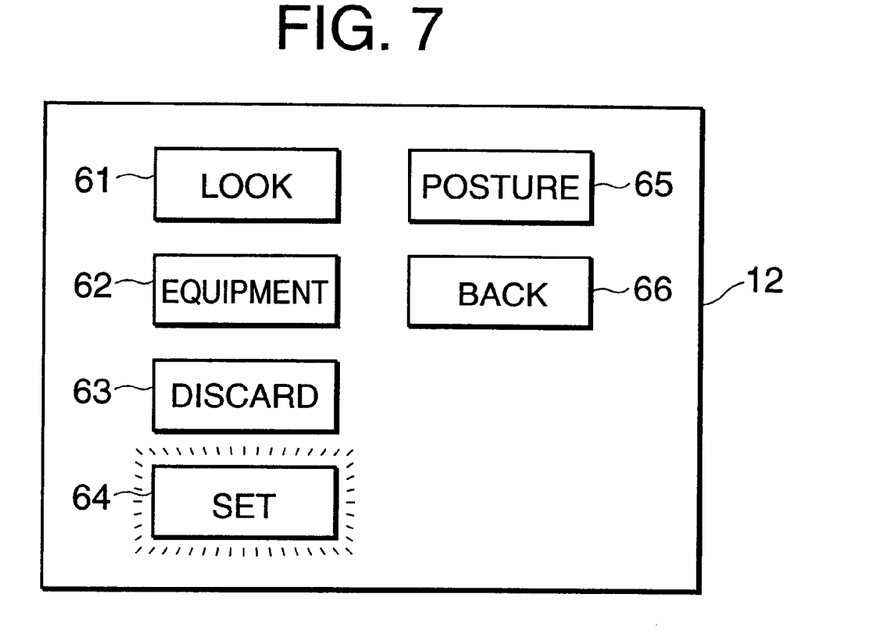
FIG. 7 is a drawing showing a status screen.
Figure 8:
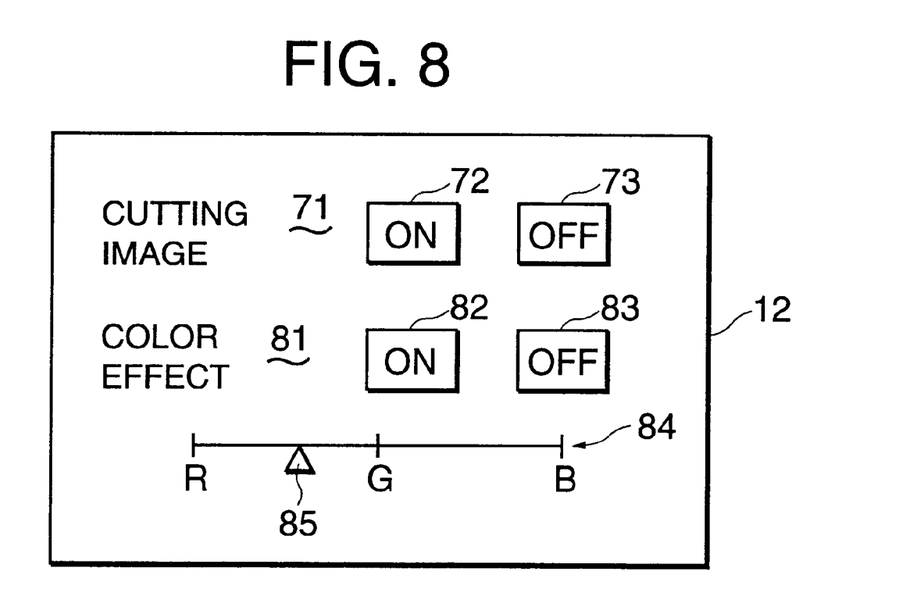
FIG. 8 is a drawing showing a setting screen.

Next, with reference to FIGS. 6 to 8, a process in which the setting change means 52 (shown in FIG. 2) changes image settings is described. FIG. 6 shows the process for changing image settings. FIG. 7 shows a status screen. FIG. 8 shows a setting screen.

In the flowchart shown in FIG. 6, in step ST300, the process determines whether the selector button 22b of the controller 22 has been pressed. If the selector button 22b has been pressed ("YES" in step ST300), the status screen is displayed in step ST310, and the process determines whether a "SET" icon 64 has been selected in step ST320.

As shown in FIG. 7, the status screen displays various icons 61 to 66 including the "SET" icon 64. By using the up-key 22U, the down-key 22D, the left key 22L, and the right key 22R, the "SET" icon 64 is selected. By pressing the fourth button 22f, the selection is determined. FIG. 7 shows that the "SET" icon 64 is selected.

In the flowchart shown in FIG. 6, when the "SET" icon 64 is not selected ("NO" in step ST320), the process determines whether the "BACK" icon 66 is selected in step ST330. When the "BACK" icon 66 is selected ("YES" in step ST330), the process stops this routine, and returns to the game screen. When the "BACK" icon 66 is not selected ("NO" in step ST330), the process returns to step ST310, and the status screen is continuously displayed.

If the select button 22b has not been pressed ("NO" in step ST300), the process determines whether the start button 22a has been pressed in step ST340. If the start button 22a has not been pressed ("NO" in step ST340), the process stops this routine, and returns to the game screen.

If the start button 22a has been pressed ("YES" in step ST340), the setting screen is displayed in step ST350.

With reference to FIG. 8, the setting screen is described.

As shown in FIG. 8, the setting screen displays a cutting image setter 71 and a color effect setter 81. The cutting image setter 71 has an "ON" icon 72 and an "OFF" icon 73. The color effect setter 81 has an "ON" icon 82, an "OFF" icon 83, and a color selector 84.

When the cutting image setter 71 is selected using the up-key 22U and the down-key 22D, the "ON" icon 72 is selected using the left key 22L and the right key 22R. The selection is determined by pressing the fourth button 22f. FIG. 8 shows that the "ON" icon 72 is selected.

When the selection of the "ON" icon 72 is determined, an image in which the cut arm or head is sent flying is used. When the selection of the "OFF" icon 73 is determined, an image in which the cut arm or head is not sent flying is used.

When the color effect setter 81 is selected using the up-key 22U and the down-key 22D, the "ON" icon 82 is selected using the left key 22L and the right key 22R. The selection of the "ON" icon 82 is determined by pressing the fourth button 22f. FIG. 8 shows that the "ON" icon 82 is selected.

By using the up-key 22U and the down-key 22D to move the display position of a mark 85 when the "ON" icon 82 is selected and determined, the color of blood can be set to be an arbitrary chromatic color of red (R) to green (G) to blue (B). FIG. 8 shows that the color of blood is set to be an intermediate color between red (R) and green (G).

By selecting and determining the "OFF" icon 83, the color of blood from a game character in a fight can be set to be transparent.

Referring back to FIG. 6, in step ST360, the process determines whether the third button 22e has been switched on. If the third button 22e has not been switched on ("NO" in step ST360), the process determines whether the setting of cruel image, namely, the setting of the cutting image and color effect has been changed in step ST370. If the setting has not been changed ("NO" in step ST370), the process returns to step ST350. If the setting has been changed ("YES" in step ST370), the image setting is changed as described above in step ST380, and the process returns to step ST350.

In addition, if the third button 22e has been switched on ("YES" in step ST360), the process stops this routine.

By using the above-described image setting in which the color of blood is set to be transparent, and the cut arm or head is not sent flying, a game with limitation for ethical considerations is realized.

In addition, because the color of blood can be set to be an arbitrary chromatic color, and an image in which the cut arm or head is not sent flying can be changed to an image in which the cut arm or head is sent flying, a game having violent images in accordance with player preference is realized, which can enhance amusement necessary for a fighting game.

The present invention is not limited to the above-described embodiments, but may be modified to the following modifications (1) to (3).

(1) The foregoing embodiment uses a leading game character that can be selected from among the first and second characters. However, by recording at least three game contents on the recording medium 30, the leading character may be selected from among at least three game characters. The modification (1) can enhance amusement by each game content.

(2) The foregoing embodiment uses human models as the first and second game characters. However, a similar game is realized, even if animal models, etc., are used.

(3) In the foregoing embodiment, the present invention is applied to a fighting game. However, the present invention may be applied to adventure games. In this application, by modifying routes for game characters, mutually independent game contents can be created.

What is claimed is:

1. A video game machine for operation by a game player to play a game through a game session extending from a game beginning to a game end, comprising:

display means for displaying images of the game performed in a predetermined game world;

at least one operation means for outputting an operation signal in accordance with an external operation performed by the game player for controlling a leading character;

first-game-content storage means for storing a first game content using a first game character as the leading character, and a second game character as another character for use with the first game content;

second-game-content storage means for storing a second game content using the second game character as the leading character, and the first game character as another character for use with the second game content;

leading-character selection means for selecting one of the first game character and the second game character as a selected leading character to function as the leading character and selecting a set game content corresponding to one of the first game content and the second game content associated with the selected leading character;

game-screen output means for outputting, to said display means, game screens in accordance with the set game content corresponding to the selected leading character;

game-progress control means for advancing the set game content by using said operation signal to control the action of the leading character displayed on said display means;

first condition determination means for determining whether a predetermined first game condition for said first game content is met;

second condition determination means for determining whether a predetermined second game condition for said second game content is met;

permission means in which when either the first game condition or the second game condition is met, said permission means permits said leading-character selection means to select another one of the first game character and the second game character to be the selected leading character within the game session after the one of the first game character and the second game character is the selected leading character;

third-game-content storage means for storing a third game content provided so that either the first game character or the second game character is selectable as the leading character for use with the third game content;

third-game leading-character selection means for selecting either the first game character or the second game character as the leading character of said third game content when both the first and second game conditions are met; and third-game screen-output means for outputting, to said display means, game screens in accordance with said third game content when both the first and second game conditions are met.

2. A video game machine according to claim 1, wherein:

said first game content is a fighting game in which the first game character fights so as to cause a predetermined amount of damage to at least one first enemy game character;

said second game content is a fighting game in which the second game character fights so as to cause a predetermined amount of damage to at least one second enemy game character;

the first game condition is met when the first game character causes said predetermined amount of damage to the first enemy game character on condition that the second game condition is met, or is met when the first game character causes a predetermined amount of damage to a first boss-enemy game character appearing after causing said predetermined amount of damage to the first enemy game character in the case where the second game condition is not met, the second game condition is met when the second game character causes said predetermined amount of damage to the second enemy game character on condition that the first game condition is met, or is met when the second game character causes a predetermined amount of damage to the first boss-enemy game character appearing after causing said predetermined amount of damage to the second enemy game character in the case where the first game condition is not met, and said third game content is a fighting game in which the selected leading character fights so as to cause a predetermined amount of damage to a second boss-enemy game character.

3. A computer-readable recording medium containing a video game program for performing a game in a predetermined game world and for operation by a game player to play a game through a game session extending from a game beginning to a game end, said video game program comprising:

a first game content using a first game character as a leading game character, and a second game character as another character for use with the first game content;

a second game content using the second game character as the leading game character, and the first game character as another character for use with the second game content; and a third game content provided so that either the first game character or the second game character is selected as the leading game character;

an operation means for outputting an operation signal in accordance with an external operation performed by the game player for controlling the leading character;

a display means for displaying images of the game performed in a predetermined game world;

a leading-character selection means for selecting one of the first game character and the second game character as the leading game character and selecting a set game content corresponding to one of the first game content and the second game content associated with the selected leading character;

a game-screen output means for outputting, to the display means, game screens in accordance with the set game content corresponding to the selected game character;

a game-progress control means for advancing the set game content by using an operation signal in accordance with an operation by the operation means to control the action of the leading character displayed on said display means;

a first condition determination means for determining whether a predetermined first game condition for said first game content is met;

a second condition determination means for determining whether a predetermined second game condition for said second game content is met;

a permission means in which when either the first game condition or the second game condition is met, said permission means permits said leading-character selection means to select another one of the first game character and the second game character to be the selected leading character within the game session after the one of the first game character and the second game character is the selected leading character;

a third-game leading-character selection means for selecting either the first game character or the second game character as the leading character of said third game content when both the first and second game conditions are met; and a third-game screen-output step for outputting, to said display means, game screens in accordance with said third game content when both the first and second game conditions are met.

4. A computer-readable recording medium according to claim 3, wherein said first game content is a fighting game in which the first game character fights so as to cause a predetermined amount of damage to at least one first enemy game character, said second game content is a fighting game in which the second game character fights so as to cause a predetermined amount of damage to at least one second enemy game character, the first game condition is met when the first game character causes said predetermined amount of damage to the first enemy game character on condition that the second game condition is met, or is met when the first game character causes a predetermined amount of damage to a first boss-enemy game character appearing after causing said predetermined amount of damage to the first enemy game character in the case where the second game condition is not met, the second game condition is met when the second game character causes said predetermined amount of damage to the second enemy game character on condition that the first game condition is met, or is met when the second game character causes a predetermined amount of damage to the first boss-enemy game character appearing after causing said predetermined amount of damage to the second enemy game character in the case where the first game condition is not met, and said third game content is a fighting game in which the selected leading character fights so as to cause a predetermined amount of damage to a second boss-enemy game character.

5. A video game machine for operation by a game player to play a game through a game session extending from a game beginning to a game end comprising:

display means for displaying images of the game performed in a predetermined game world;

at least one operation means for outputting an operation signal in accordance with an external operation performed by the game player for controlling a leading character;

game-content storage means for storing a plurality of game contents using a plurality of game characters and one of said plurality of game characters as the leading character;

leading-character selection means for selecting one game character of the plurality of game characters as a selected leading character to function as the leading character and selecting a set game content corresponding to the one of the plurality of game contents associated with the selected leading character;

game-screen output means for outputting, to said display means, game screens in accordance with the set game content corresponding to the selected leading character;

game-progress control means for advancing the set game content by using said operation signal to control the action of the leading character displayed on said display means;

condition determination means for determining whether each of predetermined game conditions provided for said plurality of game contents is met;

permission means for permitting said leading-character selection means to select another game character from among said plurality of game characters within the game session after one of the plurality of game characters is the selected leading character when any one of said predetermined game conditions is met;

another-game-content storage means for storing an another game content provided so that one of said plurality of game characters is selectable as the leading character for use with the another game content;

another-game-leading-character selection means for selecting one game character as the leading character of said another game content from among said plurality of game characters when all of said plurality of game conditions are met; and another-game-screen output means for outputting, to said display means, game screens in accordance with said another game content when all said plurality of game conditions are met.

6. A computer-readable recording medium containing a video game program for performing a game in a predetermined game world and for operation by a game player to play a game through a game session extending from a game beginning to a game end, said video game program comprising:

a plurality of game contents using a plurality of game characters, and one of said plurality of game characters as a leading character; and an another game content provided so that one of the plurality of game characters is selectable as the leading character from among said plurality of game characters;

an operation means for outputting an operation signal in accordance with an external operation performed by the game player for controlling the leading character;

a display means for displaying images of the game performed in a predetermined game world;

a leading-character selection means for selecting one game character of the plurality of game characters as a selected leading character to function as the leading character and selecting a set game content corresponding to one of the plurality of game contents associated with the selected leading character;

a game-screen output means for outputting, to the display means, game screens in accordance with the set game content corresponding to the selected leading character;

a game-progress control means for advancing the set game content by using an operation signal in accordance with an operation by the operation means to control the action of the leading character displayed on said display means;

a condition determination means for determining whether each of predetermined game conditions provided for said plurality of game contents is met;

a permission means for permitting said leading-character selection step to select another game character from said plurality of game characters within the game session after one of the plurality of game characters is selected as the leading game character when any one of said predetermined game conditions is met;

a leading-character selection means for selecting one game character as the leading character of said another game content from among said plurality of game characters when all said plurality of game conditions are met; and an another-game-screen output means for outputting, to said display means, game screens in accordance with said another game content when all said plurality of game conditions are met.

7. A video game machine for operation by a game player to play a game session extending from a game beginning to a game end comprising:

display means for displaying images of the game performed in a predetermined game world;

at least one operation means for outputting an operation signal in accordance with an external operation performed by the game player for controlling a leading character;

first-game-content storage means for storing a first game content as a fighting game using a first game character as a leading character, and a second game character as another character for use with the first game content, the first game character fighting so as to cause a predetermined amount of damage to at least one first enemy game character;

second-game-content storage means for storing a second game content, which differs from said first game content, as a fighting game using the second game character as the leading character, and the first game character as another character for use with the second game content, the second game character fighting so as to cause a predetermined amount of damage to at least one second enemy game character;

leading-character selection means for selecting one of the first game character and the second game character as a selected leading character to function as the leading character, selecting another one of the first game character and the second game character after one game character is selected as the leading character, and selecting a set game content corresponding to one of the first game content and the second game content associated with the selected leading character, in a single game session;

game-screen output means for outputting, to said display means, game screens in accordance with the set game content corresponding to the selected leading character; and game-progress control means for advancing the set game content by using said operation signal to control the action of the selected leading character displayed on said display means;

wherein said first game content is provided so that in a scene where the second character appears, the first and second game characters fight so as to cause a predetermined amount of damage to different enemy game characters, respectively, and said second game content is provided so that in a scene where the first game character appears, the first and second game characters fight so as to cause a predetermined amount of damage to different enemy game characters, respectively.

8. A computer-readable recording medium containing a video game program for performing a game in a predetermined game world and for operation by a game player to play a game through a game session extending from a game beginning to a game end, said video game program comprising:

a first game content as a fighting game using a first game character as a leading character, and a second game character as another character for use with the first game content, the first game character fighting so as to cause a predetermined amount of damage to at least one first enemy game character; and a second game content as a fighting game which differs from said first game content, said second game content using the second game character as the leading character, and the first game character as another character for use with the second game content, the second game character fighting so as to cause a predetermined amount of damage to at least one second enemy game character; and an operation means for outputting an operation signal in accordance with an external operation performed by the game player for controlling the leading character;

a display means for displaying images of the game performed in a predetermined game world;

a leading-character selection means for selecting one of the first game character and the second game character as a selected leading character to function as the leading character, selecting another one of the first game character and the second game character after one game character is selected as the leading character, and selecting a set game content corresponding to one of the first game content and the second game content associated with the selected leading character, in a single game session;

a game-screen output means for outputting, to a display means, game screens in accordance with the set game content corresponding to the selected game character;

a game-progress control means for advancing the set game content by using an operation signal in accordance with an operation by an operation means to control the action of the leading character displayed on said display means;

wherein said first game content is provided so that in a scene where the second game character appears, the first and second game characters fight so as to cause a predetermined amount of damage to different enemy game characters, respectively, and said second game content is provided so that in a scene where the first game character appears, the first and second game characters fight so as to cause a predetermined amount of damage to different enemy game characters, respectively.

* * * * *